United States Patent [19]

Lawman et al.

[11] 4,039,247

[45] Aug. 2, 1977

[54] DEVICE FOR USE IN TESTING OF FLUID SAMPLES ON MICROSCOPE SLIDES

[75] Inventors: Michael John Patrick Lawman, Bagshot; Ian Scott Caie, Woking, both of England

[73] Assignee: National Research Development Corporation, London, England

[21] Appl. No.: 640,212

[22] Filed: Dec. 12, 1975

[30] Foreign Application Priority Data

Dec. 17, 1974 United Kingdom .............. 54438/74

[51] Int. Cl.[2] .................... G02B 21/34; G01N 1/10
[52] U.S. Cl. .................................. 350/95; 356/246; 195/127
[58] Field of Search .................... 350/95, 92, 86; 356/244, 246; 195/127

[56] References Cited

U.S. PATENT DOCUMENTS

| 2,761,558 | 9/1956 | McLean, Jr. ...................... 350/92 X |
| 2,942,520 | 6/1960 | Rose ................................... 356/244 X |
| 3,883,398 | 5/1975 | Ono .................................... 350/95 X |

*Primary Examiner*—John K. Corbin
*Assistant Examiner*—John D. Lee
*Attorney, Agent, or Firm*—Cushman, Darby & Cushman

[57] ABSTRACT

A device for use in a test procedure in which a plurality of discrete fluid samples is disposed on a microscope slide which comprises a slide support and clamping means for clamping a slide between a gasket provided with a plurality of apertures therethrough and said support, said clamping means being adapted, when actuated, to apply pressure to the gasket whereby said apertures are sealed against said slide in a fluid tight manner to provide a plurality of wells for introduction of fluid thereto.

7 Claims, 1 Drawing Figure

U.S. Patent
Aug. 2, 1977
4,039,247
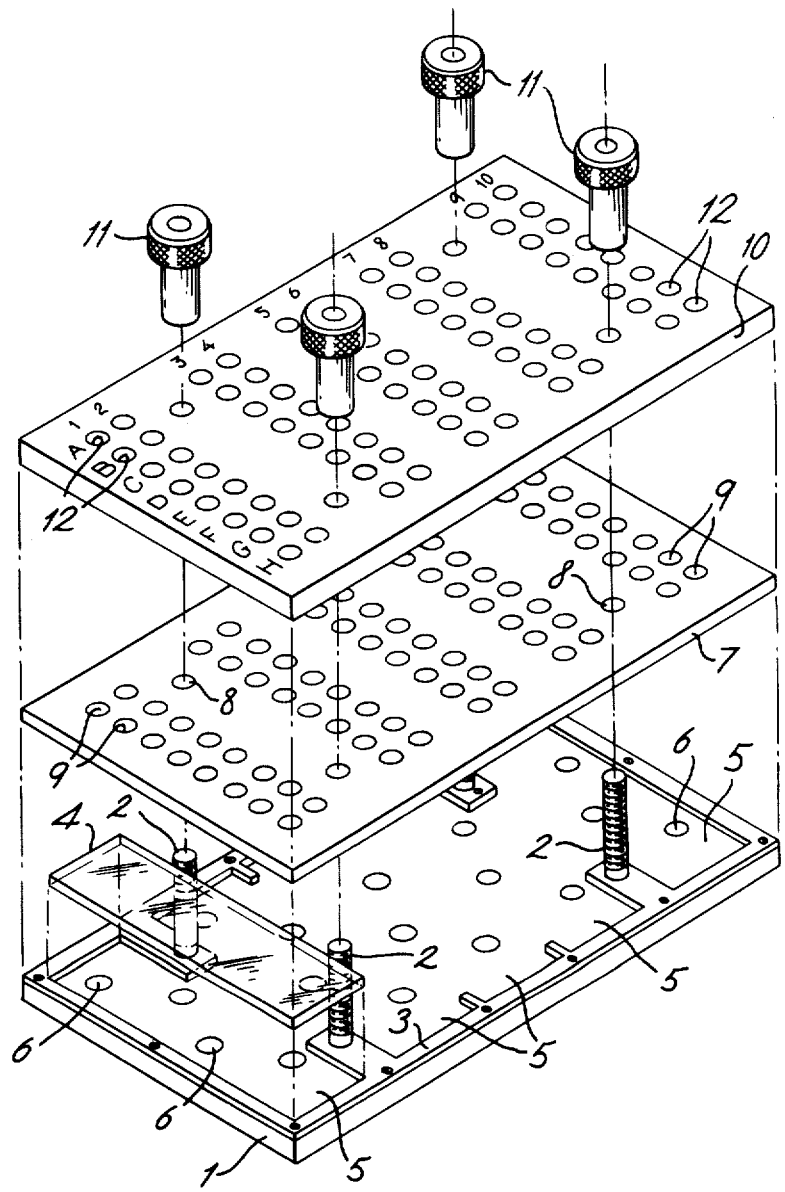

DEVICE FOR USE IN TESTING OF FLUID SAMPLES ON MICROSCOPE SLIDES

This invention relates to a device for use in test procedures wherein a plurality of discrete fluid samples is disposed on one or more microscope slides. For convenience, the device will be described in relation to test procedures in which cells are cultured on the slides, in which procedures the device finds particular application.

At present serum samples to be screened by immunofluorescence techniques are cultured in individual test tubes containing microscope cover slips on to which the cells progressively precipitate. After treatment with a suitable antigen the cells on the cover slips are stained, fixed and examined microscopically.

This method of cell culture is both cumbersome and wasteful of cells and media however and proposals have been made relating to devices in which cells are cultured, treated and examined in situ. For example a device has been proposed comprising a microtitre plate form which the base, including the base portions of the wells, has been removed and replaced by a plurality of microscope slides secured to the plate with a grease. It has been proposed that cells be cultured in the wells of the device and after treatment the slides be removed and examined microscopically. Difficulty has, however, been encountered in obtaining an effective seal between samples in adjacent wells.

Another device has also been proposed which comprises a glass slide to which the ends of the wall portions of a plurality of wells are secured by an adhesive. After cells have been cultured with in the wells and treated, the wall portions are broken away from the slide to facilitate microscopic examination. It will be appreciated that as such devices cannot generally be re-used their adoption on a large scale may be unduly costly.

A device has now been produced which overcomes these disadvantages.

According to the present invention a device for use in a test procedure in which a plurality of discrete fluid samples is disposed on a microscope slide comprises a slide support and clamping means for clamping a slide between a gasket provided with a plurality of apertures therethrough and said support, said clamping means being adapted, when actuated, to apply pressure to the gasket whereby said apertures are sealed against said slide in a fluid tight manner to provide a plurality of wells for introduction of fluid thereto.

In practice the device is adapted to carry a plurality of microscope slides each of which provides the base of a plurality of wells, said slides having a thickness in the range 0.8-1.0mm and a length and a breadth generally 76 and 25mm respectively. The clamping means generally comprises a plate adapted to overlay the gasket, said plate being provided with a plurality of apertures therethrough which are in register with the apertures n the gasket. The clamping means is preferably such as to enable a substantially uniform pressure to be applied over the apertured area of the gasket so as to provide leak-proof seals between the slides and the portions of the gasket surrounding the wells.

The gasket is typically fabricated from a sheet of flexible material which withstands repeated autoclaving, such as silicone rubber, and the surface of the gasket is readily removable from the slides with which it is in contact. Removal may be facilitated by coating the surface of the gasket for contact with the slides with a suitable release material such as polytetrafluoroethylene.

Particularly when the device is to be used for cell culture in the wells, the slide support, which is generally plate-like in form, is preferably provided with one or more inspection holes therein through which the contents of a well or wells can be examined by means of a microscope e.g. to establish the condition of cells therein.

The slide support is also preferably provided with upstanding portions locating the slides thereon, the upper surfaces of which portions lie level with or, preferably, slightly proud of the surfaces of the microscope slides when the latter are in place on the support. The gasket preferably overlays both the slide and said upstanding portions.

An embodiment of the present invention will now be described by way of example only, with reference to the accompanying drawing which shows an exploded view in perspective of a device suitable for the culture of cells on microscope slides.

Referring now to the drawing, a slide support of stainless steel in the form of a generally rectangular plate 162mm × 92mm carried four upstanding stainless steel studs disposed at the corners of a rectangle the edges of which are parallel to the plate. The studs pass through apertures (not shown) in a brass template which is secured to the support and which is shaped to locate five glass microscope slides (only one shown) 76 × 25 × 0.8-1.0 mm is a parallel dispostion on five portions of the support. Each of said portions is provided with four circular inspection holes in a staggered arrangement, permitting inspection of the wells by an inverted microscope not shown. The surfaces of the microscope slides, when in place, lie slightly proud of the peripheral template surfaces so that good sealing contact can be obtained between the slides and a rectangular gasket of silicone rubber (162 × 92 mm), spray coated with polytetrafluoroethylene to facilitate release from the slides. The gasket is provided with stud-receiving apertures which allow the gasket to overlay slides on the support and the template. The gasket is also provided with ten rows of eight well-forming apertures arranged in pairs so as to lie over the length of five microscope slides (only one shown) carried on the support. The gasket is clamped over the slides and template by a plate of stainless steel, 162 × 92 mm., pressurised by knurled nuts each threadably carried on a stud passing therethrough. The plate is provided with a plurality of well-forming apertures which register with the apertures in the gasket.

When used for screening batches of serum samples by immunoflurescence techniques, the device is first assembled, five microscope slides being clamped between the gasket and support, by the plate. Eighty wells are thus produced the bases of which are provided by the surfaces of the slides and the walls by the gasket and plate. The wells are inoculated with serum, sealed with microtitre tape and incubated at 37°C. Cell monolayers form and adhere to slides and the condition thereof can be determined by inspection with a microscope through the inspection holes. Only four of the 16 wells on each slide can be inspected but this is sufficient to provide information on the cell growth in all the wells. The tape is then removed, the cells fixed in situ and subjected to an immunofluorescent testing procedure after which the cells are stained and the device dismantled. After removal of the slides each carrying a plurality of cells samples thereon, the samples are covered with glycerol and coverslips and examined under a microscope.

In further embodiments of the present device the brass template shown in the drawing may be replaced by a template which is not screwed to the slide support as shown in the drawing, but which is provided with a peripheral flange assisting in location of the template by engagement with the sides of the support. The template may be readily removed from the slide support for cleaning.

The inspection holes shown in the drawing may however be disposed in register with the apertures in the gasket and plate if so desired and in this case the number of holes present in the plate is increased to 80, arranged in five paired rows.

We claim:

1. A device for use in a test procedure in which a plurality of discrete fluid samples is disposed on a microscope slide comprising:
    a slide support for supporting a plurality of slides and having a plurality of inspection holes therethrough;
    a flexible gasket provided with a plurality of apertures therethrough for contacting said slides on said support to define a plurality of sample wells;
    means for clamping said gasket to said support to apply pressure to said gasket so as to seal said gasket apertures against said slide in a fluid tight relation including a plate for overlaying said gasket for contact therewith, said plate having a plurality of apertures for registration with the gasket apertures, a plurality of studs carried by said support and extending through stud apertures in said gasket and plate, and fastener means for engaging said studs to clamp said gasket and slide between said plate and support.

2. A device according to claim 1, wherein said studs are located adjacent the periphery of said plate.

3. A device according to claim 1, which comprises a gasket of a material which withstands autoclaving.

4. A device according to claim 6, in which the gasket is of a silicone rubber.

5. A device according to claim 1, which comprises a gasket the surface of which for contact with the slide is treated with a material facilitating release therefrom.

6. A device according to claim 1, in which the slide support is provided with means for locating a plurality of slides thereon side by side in a row.

7. A device as in claim 1, wherein said inspection holes are dimensioned to accommodate the head of a microscope.

* * * * *